US012419334B2

(12) United States Patent
Matsuzawa et al.

(10) Patent No.: US 12,419,334 B2
(45) Date of Patent: Sep. 23, 2025

(54) UMAMI-ENHANCING COMPOSITION, SEASONING OR EXTRACT, METHOD FOR MANUFACTURING UMAMI-ENHANCING COMPOSITION, METHOD FOR MANUFACTURING SEASONING OR EXTRACT, AND METHOD FOR ENHANCING UMAMI OF FOOD PRODUCT

(71) Applicant: J-OIL MILLS, Inc., Tokyo (JP)

(72) Inventors: Shun Matsuzawa, Tokyo (JP); Masayoshi Sakaino, Tokyo (JP); Misaki Tsuji, Tokyo (JP); Takahiro Tokuchi, Tokyo (JP); Takashi Sano, Tokyo (JP)

(73) Assignee: J-OIL MILLS, Inc., Tokyo (JP)

( * ) Notice: Subject to any disclaimer, the term of this patent is extended or adjusted under 35 U.S.C. 154(b) by 652 days.

(21) Appl. No.: 17/761,844

(22) PCT Filed: Sep. 14, 2020

(86) PCT No.: PCT/JP2020/034713
§ 371 (c)(1),
(2) Date: Mar. 18, 2022

(87) PCT Pub. No.: WO2021/065441
PCT Pub. Date: Apr. 8, 2021

(65) Prior Publication Data
US 2022/0330588 A1 Oct. 20, 2022

(30) Foreign Application Priority Data

Sep. 30, 2019 (JP) ................. 2019-178669

(51) Int. Cl.
*A23L 27/20* (2016.01)
*A23D 9/007* (2006.01)
*A23L 13/30* (2016.01)
*A23L 23/00* (2016.01)
*A23L 27/00* (2016.01)
*A23L 31/15* (2016.01)

(52) U.S. Cl.
CPC ............ *A23L 27/203* (2016.08); *A23D 9/007* (2013.01); *A23L 13/30* (2016.08); *A23L 23/00* (2016.08); *A23L 27/88* (2016.08); *A23L 31/15* (2016.08); *A23V 2002/00* (2013.01)

(58) Field of Classification Search
None
See application file for complete search history.

(56) References Cited

U.S. PATENT DOCUMENTS 5,084,292 A  1/1992  Dort et al.
2008/0311267 A1  12/2008  Leigh et al.
2012/0177797 A1  7/2012  Yamaguchi et al.

FOREIGN PATENT DOCUMENTS

| JP | 5618542 A | 2/1981 |
| JP | 56-58450 A | 5/1981 |
| JP | 60-256344 A | 12/1985 |
| JP | 3-255198 A | 11/1991 |
| JP | 6-93285 A | 4/1994 |
| JP | 8-99872 A | 4/1996 |
| JP | 2017-93456 A | 6/2017 |
| JP | 6507466 B2 | 5/2019 |
| WO | 2011/030650 A1 | 3/2011 |
| WO | 2014/077019 A1 | 5/2014 |
| WO | 2017/025804 A1 | 2/2017 |

OTHER PUBLICATIONS

International Search Report (ISR) dated Nov. 10, 2020 filed in PCT/JP2020/034713.
Takagi et al., "Antioxidant Effect of β-Carotene added to Edible Oils on Peroxidation by Light or Heating", Kawasaki Medical Welfare Journal, 2000, vol. 10, No. 2, pp. 335-340, English abstract; Cited in ISR.
PCT Notification of Transmittal of Translation of the International Preliminary Report on Patentability (IPRP) and Written Opinion of the International Searching Authority dated Nov. 10, 2020 filed in PCT/JP2020/034713.
Kawakami, "Ionone Series Compounds from β-Carotene by Thermal Degradation in Aqueous Medium", Nippon Nogeikagaku Kaishi, 1982, vol. 56, No. 10, pp. 917-921, total 9 pages; Cited in Written opposition; English abstract.
Maoka, "40 years of carotenoid research—Fascinated by natural pigment-", Studies in Science and Technology, 2018, vol. 7, No. 2, pp. 93-100, total 16 pages; Cited in Written opposition; Partial English translation.
Nakanishi, "Use of fats and oils for cooking and seasoning", Journal of Cookery Science of Japan 2014, Apr. 5, 2018, vol. 47, No. 2, pp. 114-116, total 8 pages; Cited in Written opposition; Partial English translation.
Miura et al., "Flavor of Palm Oil", Journal of Japan Oil Chemists Society, 1980, vol. 29, No. 2, pp. 97-101, total 9 pages; Cited in Written opposition; English abstract.
Ohi et al., "Effects of the Addition of the Natural Carotenoid Astaxanthin from Microalgae Haematococcus pluvialis on the Physical Properties of Bread", Nippon Shokuhin Kagaku Kogaku Kaishi (Journal of the Japanese Society for Food Science and Technology), 2009, vol. 56, No. 11, pp. 579~584, total 8 pages; Cited in Written opposition; English abstract.

(Continued)

*Primary Examiner* — Jyoti Chawla
(74) *Attorney, Agent, or Firm* — RANKIN, HILL & CLARK LLP

(57) ABSTRACT

To provide an edible ingredient having an exceptional effect for enhancing umami.
An umami-enhancing composition having a carotenoid degradation product as an active ingredient. The umami-enhancing composition can be formulated through a manufacturing method that includes a step for adding a carotenoid to an edible oil and fat, and a step for degrading the carotenoid in the edible oil and fat. The carotenoid degradation product is preferably a degradation product of one or more selected from the group consisting of carotenes and xanthophylls. The umami-enhancing composition is optimally used as a food-product ingredient, etc., for manufacturing a seasoning or extract or for enhancing the umami of a food product.

8 Claims, No Drawings

(56) References Cited

OTHER PUBLICATIONS

Yamazaki et al., "Relationship between enhancement and duration of taste by interaction with umami and sweetness", 2018 Convention Japan Cooking Science Society, 2018, total 19 pages; Cited in Written opposition; English abstract.

Pertig et al., "Stabilization of Carotenoids", Research Article, Chemical Engineering Technology, 2012, pp. 1045-1050, total 14 pages; Cited in Written opposition; English translation.

Catalog of "Astaxanthin", Oryza, Oryza Oil & Fat Chemical Co., Ltd., 2020, ver. 2.4 YF, total 62 Pages; Cited in Written opposition; English catalog.

Written opposition dated Mar. 17, 2022 for Japanese Patent No. 6937958.

Notice of Dispatch of Duplicates of a Written Opposition dated Apr. 12, 2022 for Japanese Patent No. 6937958; English machine translation.

UMAMI-ENHANCING COMPOSITION, SEASONING OR EXTRACT, METHOD FOR MANUFACTURING UMAMI-ENHANCING COMPOSITION, METHOD FOR MANUFACTURING SEASONING OR EXTRACT, AND METHOD FOR ENHANCING UMAMI OF FOOD PRODUCT

TECHNICAL FIELD

The present invention relates to a carotenoid-derived ingredient having an exceptional effect for enhancing umami, and a use of said ingredient.

BACKGROUND ART

The five original flavors that form a basis for tasting food products (basic flavors) are sweetness, sourness, saltiness, bitterness, and umami. Enhancing or reducing these flavors in food products raises the tastiness of the food products, it being desirable to enhance umami.

Patent Document 1 (International Publication No. 2011/030650) discloses adding a specific aldehyde or a specific alcohol to an aqueous solution of monosodium glutamate, which is an umami component, whereby umami is enhanced.

RELATED ART DOCUMENTS

Patent Documents

[Patent Document 1] International Publication No. 2011/030650

DISCLOSURE OF THE INVENTION

Problems the Invention is Intended to Solve

However, in view of the preferences of consumers and the increasingly diverse needs of enterprises involved in the foodstuffs trade, it has become desirable to provide novel ingredients of non-conventional origin.

It is accordingly an object of the present invention to provide an edible ingredient having an exceptional effect for enhancing umami.

Means for Solving the Problems

According to a first aspect of the present invention, there is provided an umami-enhancing composition having a carotenoid degradation product as an active ingredient.

In the umami-enhancing composition described above, the carotenoid degradation product is preferably a degradation product of one or more selected from the group consisting of carotenes and xanthophylls.

The umami-enhancing composition described above preferably contains $1 \times 10^{-6}$ mass ppm or more and 100000 mass ppm or less of the carotenoid degradation product in terms of the amount of pre-degraded carotenoids.

The umami-enhancing composition described above is preferably in the form of an edible oil and fat composition.

According to a second aspect of the present invention, there is provided a seasoning or extract that contains the umami-enhancing composition described above.

According to a third aspect of the present invention, there is provided a method for manufacturing an umami-enhancing composition, the method including a step for adding a carotenoid to an edible oil and fat, and a step for degrading the carotenoid in the edible oil and fat.

In the method for manufacturing an umami-enhancing composition described above, the degradation of the carotenoid is preferably carried out through heat treatment at 50° C. or greater and 220° C. or lower for 0.1 hours or more and 240 hours or less.

In the method for manufacturing an umami-enhancing composition described above, the heat treatment preferably involves supplying oxygen.

In the method for manufacturing an umami-enhancing composition described above, it is preferable that 1 mass ppm or more and 100000 mass ppm or less of the carotenoid is added to the edible oil and fat.

In the method for manufacturing an umami-enhancing composition described above, the carotenoid is preferably one or more selected from the group consisting of carotenes and xanthophylls.

In the method for manufacturing an umami-enhancing composition described above, it is preferable that, after the step for degrading the carotenoid in the edible oil and fat has been completed, there is furthermore included a step for mixing with a new edible oil and fat.

According to a fourth aspect of the present invention, there is provided a method for manufacturing a seasoning or extract, the method including a step for mixing an umami component and an umami-enhancing composition obtained through the method for manufacturing an umami-enhancing composition described above.

According to a fifth aspect of the present invention, there is provided a method for enhancing the umami of a food product, the method involving imparting the umami-enhancing composition described above to a food product.

In the method for enhancing the umami of a food product described above, the carotenoid degradation product is preferably incorporated in the food product in an amount of $1 \times 10^{-8}$ mass ppm or more and 100 mass ppm or less in terms of the amount of pre-degraded carotenoids.

Effect of the Invention

According to the present invention, it is possible to provide an edible ingredient that has an exceptional effect for enhancing umami and that is derived from a carotenoid, which is also known as an edible dye.

MODE FOR CARRYING OUT THE INVENTION

Examples of the pre-degraded cartenoid for the caratenoid degradation product used in the present invention include: β-carotene, α-carotene, lycopene, and other carotenes; lutein, canthaxanthin, β-cryptoxanthin, astaxanthin, zeaxanthin, fucoxanthin, bioraxanthin, crosin, capsanthin, and other xanthophylls; and retinol, bixin, norbixin, crocetin, and other apocarotenoids. Among these, carotenes and xanthophylls are preferred, β-carotene, α-carotene, and astaxanthin are more preferred, β-carotene and astaxanthin are even more preferred, and β-carotene is yet even more preferred. Insofar as carotenoids are edible dyes, etc., that are approved/acknowledged as food product additives, carotenoids are optimal because the safety thereof as edible components is generally confirmed. A carotenoid degradation product derived from one type of carotenoid may be used alone, or degradation products derived from two or more carotenoids may be used in combination. In the latter case, the degradation products may be obtained by implementing a degradation treatment on the two or more carotenoids in a mixed state.

In a discretionary non-limiting mode of the present invention, the carotenoid degradation product is obtained by adding the carotenoid to an edible oil and fat (base oil) to formulate a raw-material oil and fat composition, and degrading the carotenoid within the raw-material oil and fat composition. The oil and fat composition containing the carotenoid degradation product thus obtained also has functionality for enhancing umami. Furthermore, the carotenoid degradation product may be used upon appropriately extracting or concentrating the resultant carotenoid degradation product from the oil and fat composition containing said degradation product. There is no particular limitation as to the methods for extraction and concentration; for example, it is possible to employ extraction methods in which organic solvents are used, and concentration methods achieved through column chromatography, molecular distillation, or water vapor distillation.

An edible oil and fat that is well known to persons skilled in the art can be employed, as appropriate, as the edible oil and fat when formulating the composition as described above. Examples include: soybean oil, rapeseed oil (canola oil), palm oil, corn oil, olive oil, sesame oil, safflower oil, sunflower oil, cottonseed oil, rice bran oil, peanut oil, palm kernel oil, coconut oil, and other vegetable oils and fats; beef tallow, lard, chicken fat, milk fat, and other animal oils and fats; and medium-chain fatty acid triglycerides, or processed oils and fats obtained by implementing fractionation, hydrogenation, transesterification, etc., on these oils and fats. One of the edible oils and fats may be used alone, or two or more thereof may be mixed together. Among these edible oils and fats, those having an iodine value (also referred to below as "IV") of 0 or more and 140 or less are preferred. The iodine value can be measured in conformance with "Standard methods for the analysis of fats, oils and related materials: 2.3.4 Iodine value" (Japan Oil Chemists' Society).

In a discretionary non-limiting mode of the present invention, it is preferable to use one or more selected from the group consisting of medium-chain fatty acid triglycerides and vegetable oils and fats as the edible oil and fat, even more preferable to use one or more selected from the group consisting of medium-chain fatty acid triglycerides and rapeseed oil as the edible oil and fat, and particularly preferable to use a medium-chain fatty acid triglyceride as the edible oil and fat.

The amount of the carotenoid added to the edible oil and fat when formulating the composition as described above (the total added amount when two or more are degraded in a mixed state) is preferably such that the carotenoid content reaches 1 mass ppm or more and 100000 mass ppm or less, more preferably such that the carotenoid content reaches 10 mass ppm or more and 70000 mass ppm or less, even more preferably that the carotenoid content reaches 20 mass ppm or more and 50000 mass ppm or less, and particularly preferably that the carotenoid content reaches 30 mass ppm or more and 30000 mass ppm or less.

There is no particular limitation as to the means for degrading the carotenoid within the edible oil and fat when formulating the composition as described above, but heating means are preferred; from the standpoint of production on an industrial scale, it is preferable to accommodate the carotenoid in a suitable container, such as a tank, and then conduct a prescribed heat treatment using heating means that heats via, e.g., thermoelectric conversion, direct-flame burners, microwaves, steam, or hot blasts of air, said heating means being provided to the container. The heating conditions are to be set, as appropriate, such that a desired amount of a resultant material (e.g., the carotenoid degradation product) is obtained. Heating conditions differ depending on, inter alia, the type of carotenoid and the type of edible oil and fat used as a base oil, the results depending on which conditions are employed; however, it is typical to perform heating at a heating temperature of 50° C. or greater and 220° C. or lower for a heating time of 0.1 hours or more and 240 hours or less, and more typical to perform heating at a heating temperature of 60° C. or greater and 160° C. or lower for a heating time of one hour or more and 100 hours or less. As conditions for an integration amount obtained by multiplying heating temperature (° C.) by heating time (hours), it is typical to perform the heat treatment using an integration amount of 200 or more and 20000 or less, more typical to perform the heat treatment using an integration amount of 300 or more and 16000 or less, and even more typical to perform the heat treatment using an integration amount of 400 or more and 14000 or less. When the heating temperature is varied, the integration amount obtained by multiplying heating temperature (° C.) by heating time (hours) can be calculated as the sum of the product of the heating temperature (° C.) before the change in temperature and the heating time (hours) before the change in temperature and the product of the heating temperature (° C.) after the change in temperature and the heating time (hours) after the change in temperature, or as an integral value of the heating temperature (° C.) over the heating time (hours).

During the heat treatment, oxygen may be taken in from an open space in the container by stirring, or oxygen may be blown in, to supply the oxygen (air). Air, etc., may be used as an oxygen source. This promotes degradation of the carotenoid. In this case, the amount of oxygen supplied is preferably set so as to reach 0.001-2 L/min per kilogram of the raw-material oil and fat composition. For example, when air is used, the amount supplied is preferably 0.005-10 L/min, and even more preferably 0.01-5 L/min, per kilogram of the raw-material oil and fat composition.

The oil and fat composition containing the carotenoid degradation product obtained as described above may be formed by furthermore mixing other edible oils and fats. Similarly to the edible oil and fat employed when formulating the composition as described above, examples of such other edible oils and fats for manufacturing the oil and fat composition include: soybean oil, rapeseed oil (canola oil), palm oil, corn oil, olive oil, sesame oil, safflower oil, sunflower oil, cottonseed oil, rice bran oil, peanut oil, palm kernel oil, coconut oil, and other vegetable oils and fats; beef tallow, lard, chicken fat, milk fat, and other animal oils and fats; and medium-chain fatty acid triglycerides, or processed oils and fats obtained by implementing fractionation, hydrogenation, transesterification, etc., on these oils and fats. One of these other edible oils and fats may be used alone, or two or more thereof may be mixed together. There is no particular limitation as to the blending ratio; however, the amount of the oil and fat composition containing the carotenoid degradation product with respect to the total mass of the oil and fat composition containing the carotenoid degradation product and the other edible oils and fats is preferably $1 \times 10^{-4}$ mass % or more and less than 100 mass %, more preferably $1 \times 10^{-3}$ mass % or more and less than 100 mass %, even more preferably $1 \times 10^{-2}$ mass % or more and less than 100 mass %, and particularly preferably $1 \times 10^{-4}$ mass % or more and less than 100 mass %. During blending of the oil and fat composition, one type of oil and fat composition containing a carotenoid degradation product may be incorporated alone into the other edible oils and fats, or two or more may be used in combination.

Furthermore, suitable additive ingredients may be blended, as appropriate, into the oil and fat composition containing the carotenoid degradation product obtained as described above, within a range in which the desired function of enhancing umami is not hindered. Specific examples include: fatty acid esters of ascorbic acid, lignans, coenzyme Q, γ-oryzanol, tocopherol, and other antioxidants; spices, spice extracts, animal essences, fatty acids, and other flavor-imparting ingredients; emulsifiers; silicone; and pigments.

In the present invention, the carotenoid degradation product and the oil and fat composition containing the same are used in enhancing umami, and specifically are used as active ingredients of an umami-enhancing composition.

In the umami-enhancing composition according to the present invention, the carotenoid degradation product content thereof is preferably determined, as appropriate, from the standpoint of reaching a desired optimal amount during application, and there is no particular limitation as to the carotenoid degradation product content. However, the carotenoid degradation product content is preferably $1\times10^{-6}$ mass ppm or more and 100000 mass ppm or less, more preferably $1\times10^{-5}$ mass ppm or more and 70000 mass ppm or less, even more preferably $1\times10^{-4}$ mass ppm or more and 50000 mass ppm or less, and particularly preferably $1\times10^{-3}$ mass ppm or more and 30000 mass ppm or less, in terms of the amount of pre-degraded carotenoids.

In a discretionary non-limiting mode of the present invention, the umami-enhancing composition may be in the form of an edible oil and fat composition. Specifically, e.g., an edible oil and fat, a diluent, an auxiliary agent, an emulsifier, a pH adjuster, etc., may be discretionarily blended as needed, and an edible oil and fat composition in the form of a liquid, a powder, a paste, or another discretionary form can be produced through a publicly known method. Specifically, for example, the edible oil and fat composition may be formulated, through use of a formulation technique well known to ordinary persons skilled in the art, as a liquid oil and fat, margarine, fat spread, shortening, powdered oil and fat, etc., that mainly contains oil and fat components, or in the form of a solution, a powder, a gel, granules, etc., in which the blended amount of oil and fat components is low; these forms can be employed in a discretionary manner. In addition, for example, when the edible oil and fat composition is powderized, corn syrup or another auxiliary agent can be used, and furthermore an emulsifier may be added to formulate an emulsification raw material, which may then be powderized. Examples of means for powderization include spray-drying and freeze-drying. The carotenoid degradation product formulated in the raw-material oil and fat composition in the manner described above, or the oil and fat composition containing said carotenoid degradation product, may be used without modification in the one of forms as being the edible oil and fat composition.

The umami-enhancing composition according to the present invention may be used in the form of an edible oil and fat composition as described above; in that instance, the carotenoid degradation product content of the edible oil and fat composition is preferably determined, as appropriate, from the standpoint of reaching a desired optimal amount during application, and there is no particular limitation as to the carotenoid degradation product content. However, the carotenoid degradation product content is preferably $1\times10^{-6}$ mass ppm or more and 100000 mass ppm or less, more preferably $1\times10^{-5}$ mass ppm or more and 70000 mass ppm or less, even more preferably $1\times10^{-4}$ mass ppm or more and 50000 mass ppm or less, and particularly preferably $1\times10^{-3}$ mass ppm or more and 30000 mass ppm or less, in terms of the amount of pre-degraded carotenoids.

In a discretionary non-limiting mode of the present invention, there may be provided a seasoning or extract that contains the umami-enhancing composition. Specifically, for example, the umami-enhancing composition can be added, mixed, dissolved, dispersed, emulsified, injected, etc., at a discretionary timing into a raw material for the seasoning or extract, an intermediate article of a manufacturing step, etc., whereby the umami-enhancing composition and an umami component that is a constituent element of the seasoning or extract are mixed to obtain the seasoning or extract.

In another discretionary non-limiting mode of the present invention, there may be provided an oil and fat composition for cooking with heat that contains the umami-enhancing composition. Specifically, for example, the umami-enhancing composition may be mixed with an edible oil and fat to obtain the oil and fat composition for cooking with heat. The oil and fat composition for cooking with heat can be used to fry, stir-fry, or otherwise cook with heat an umami food such as: pork, chicken, beef, and other meats from livestock animals; fish, shellfish, and other seafood; and mushrooms, thereby yielding a heat-cooked food product in which umami is enhanced. As shall be apparent, such an oil and fat composition for cooking with heat is one mode of use for the edible oil and fat composition described above.

When the present invention is applied to a seasoning, an umami component is preferably contained in the seasoning, and there is no particular limitation as to the seasoning. Examples thereof include: monosodium glutamate, sodium inosinate, sodium guanylate, and mixtures of these; and soy sauce, miso, ketchup, and Worcester sauce.

When the present invention is applied to a seasoning, the carotenoid degradation product content of the seasoning is preferably determined, as appropriate, from the standpoint of reaching a desired optimal amount during application, and there is no particular limitation as to the carotenoid degradation product content. However, the carotenoid degradation product content is preferably $1\times10^{-8}$ mass ppm or more and 1000 mass ppm or less, more preferably $1\times10^{-7}$ mass ppm or more and 700 mass ppm or less, even more preferably $1\times10^{-6}$ mass ppm or more and 500 mass ppm or less, and particularly preferably $1\times10^{-5}$ mass ppm or more and 300 mass ppm or less, in terms of the amount of pre-degraded carotenoids.

When the present invention is applied to an extract, an umami component is preferably contained in the extract, and there is no particular limitation as to the extract. Examples thereof include: marine product extracts extracted from marine products such as bonito, mackerel, scallops, oysters, and konbu; meat extracts obtained by extraction from the meat, bones, carcass, etc., of livestock animals from which pork, chicken, beef etc., are obtained; yeast extracts extracted from yeast; and vegetable extracts extracted from various vegetables (onion, garlic, cabbage, etc.).

When the present invention is applied to an extract, the carotenoid degradation product content of the extract is preferably determined, as appropriate, from the standpoint of reaching a desired optimal amount during application, and there is no particular limitation as to the carotenoid degradation product content. However, the carotenoid degradation product content is preferably $1\times10^{-8}$ mass ppm or more and 1000 mass ppm or less, more preferably $1\times10^{-7}$ mass ppm or more and 700 mass ppm or less, even more preferably $1\times10^{-6}$ mass ppm or more and 500 mass ppm or less, and particularly preferably $1\times10^{-5}$ mass ppm or more and 300 mass ppm or less, in terms of the amount of pre-degraded carotenoids.

In a discretionary non-limiting mode of the present invention, there may be provided a method for enhancing the umami of a food product by imparting the umami-enhancing composition to a food product. Specifically, for example, the umami-enhancing composition can be added, mixed, dissolved, dispersed, emulsified, injected, etc., at a discretionary timing into a raw material for a food product, an intermediate article of a manufacturing step, etc., whereby the umami of a food product presenting umami is enhanced. It is also possible to enhance the umami of a heat-cooked food product, obtained by frying, stir-frying, or otherwise cooking an umami food with heat, using the umami-enhancing composition in the form of an oil and fat composition for cooking with heat that is obtained by addition of the umami-enhancing composition. There is no particular limitation as to the state in which the umami-enhancing composition is imparted to the food product; said composition may not only be added, etc., to a raw material or an intermediate article of a manufacturing step, but also may be imparted to a food product by sprinkling or coating after the food product is cooked, processed, manufactured, etc.

When the present invention is applied to a food product, the carotenoid degradation product content of the food product is preferably determined, as appropriate, from the standpoint of reaching a desired optimal amount during application, and there is no particular limitation as to the carotenoid degradation product content. However, the carotenoid degradation product content is preferably $1\times10^{-8}$ mass ppm or more and 100 mass ppm or less, more preferably $1\times10^{-7}$ mass ppm or more and 70 mass ppm or less, even more preferably $1\times10^{-6}$ mass ppm or more and 50 mass ppm or less, and particularly preferably $1\times10^{-5}$ mass ppm or more and 30 mass ppm or less, in terms of the amount of pre-degraded carotenoids.

In a discretionary non-limiting mode of the present invention, it is possible for an article formulated by adding the carotenoid degradation product and an article formulated in the same manner without adding the carotenoid degradation product to be submitted to a sensory evaluation test, preferably a sensory evaluation test carried out by a plurality of panel experts chosen from a population so as not to have a preferential tendency, to thereby conduct an objective evaluation as to whether the umami of the food product, seasoning, extract, oil and fat composition, etc., to which the present invention is applied has been enhanced.

The food product, seasoning, extract, oil and fat composition, etc., to which the present invention can be applied is not limited in scope to use for humans, but rather can be applied also to pet food, fodder, etc., for animals.

EXAMPLES

Examples are given below to more specifically describe the present invention, but these examples do not in any way limit the present invention.

First, a base oil and a caretenoid are given as examples of the edible oil and fat used in the present example.
(Base Oil and Carotenoid)
MCT: Medium-chain fatty acid triglyceride, trade name "Coconado MT," IV=0, manufactured by Kao Corp.
Rapeseed oil: Ajinomoto sarasara canola oil, IV=115, manufactured by J-Oil Mills
β-carotene: β-carotene 30% suspension (manufactured by DSM)
Astaxanthin: Astaxanthin oil Astabio AR5 (manufactured by Biogenic Co., Ltd.)

(Quantification of β-Carotene)

The method for quantifying the β-carotene is described below. This component was quantified by analysis through high-performance liquid chromatography (HPLC analysis). Specifically: 0.5 g of β-carotene, an edible oil and fat to which β-carotene was added, or an oxidized oil and fat composition was measured out; each of these components was diluted in a measuring flask using 10 mL of acetone and tetrahydrofuran in a ratio of 1:1; the diluted components were supplied for HPLC analysis; and the β-carotene content was quantified from a calibration curve. The calibration curve was created, using a reagent (manufactured by Fujifilm Wako Pure Chemical Corp.) of β-carotene (model no. 035-05531) as a quantification formulation, from the peak area upon supply to HPLC analysis for each prescribed concentration. The primary analysis conditions are indicated below.

(HPLC Conditions)
Detector: Photodiode array detector "2996 Photodiode Array Detector" (Waters), detected at 300-600 nm
Column: Shim-pack VP-ODS, 4.6 mmID×250 mm, 4.6 μm (Shimadzu Corp.)
Column temperature: 50° C.
Injection amount: 5 μL
Flow rate: 1.2 mL/min
Mobile phase A: Acetonitrile
Mobile phase B: Ethanol
Mobile phase C: Acetone
Gradient conditions: Refer to table 1

TABLE 1

| Gradient conditions | | | |
|---|---|---|---|
| Min | A (vol %) | B (vol %) | C (vol %) |
| 0 | 80 | 20 | 0 |
| 22.0 | 80 | 20 | 0 |
| 22.1 | 0 | 0 | 100 |
| 25.0 | 0 | 0 | 100 |
| 25.1 | 80 | 20 | 0 |
| 30.0 | 80 | 20 | 0 |

(Quantification of Astaxanthin)

The method for quantifying the astaxanthin is described below. This component was quantified by analysis through high-performance liquid chromatography (HPLC analysis). Specifically: 2 g of astaxanthin, an edible oil and fat to which astaxanthin was added, or an oxidized oil and fat composition was measured out; each of these components was diluted in a measuring flask using 10 mL of acetone; the diluted components were dissolved and supplied for HPLC analysis; and the astaxanthin content was quantified from a calibration curve. The calibration curve was created, using a reagent of astaxanthin (model no. 600113) (manufactured by MedKoo Biosciences) as a quantification formulation, from the peak area upon supply to HPLC analysis for each prescribed concentration. The primary analysis conditions are indicated below.

(HPLC Conditions)
Detector: Photodiode array detector "2996 Photodiode Array Detector" (Waters), detected at 400-600 nm
Column: YMC Carotenoid, 4.6 mmID×250 mm, 5 μm (YMC Co., Ltd.)
Column temperature: 25° C.
Injection amount: 10 μL Flow rate: 1.0 mL/min
Mobile phase A: Methanol
Mobile phase B: tert-butyl methyl ether
Mobile phase C: Ultrapure water
Gradient conditions: Refer to table 2

TABLE 2

| | Gradient conditions | | |
|---|---|---|---|
| Min | A (vol %) | B (vol %) | C (vol %) |
| 0 | 81 | 15 | 4 |
| 90.0 | 6 | 90 | 4 |
| 95.0 | 6 | 90 | 4 |
| 95.1 | 81 | 15 | 4 |
| 105.0 | 81 | 15 | 4 |

[Measurement of Iodine Value (IV)]
The IV of the base oil was measured in conformance with "Standard methods for the analysis of fats, oils and related materials: 2.3.4 Iodine value" (Japan Oil Chemists' Society).
(Formulation of Oil and Fat Composition)
Various oil and fat compositions were formulated using the blends indicated in table 3. Specifically, the carotenoid (β-carotene or astaxanthin) was added to a base oil so as to reach a prescribed concentration (mass ppm), a total amount of 240 g was reached, and heat treatment was carried out under the heat treatment conditions indicated in table 3 while the components were stirred, to obtain the oil and fat compositions in examples 1 to 6. In examples other than example 2, treatment was carried out while air was supplied (200 mL/min). As comparative example 1, in which no heat treatment was carried out, β-carotene was added to medium-chain fatty acid triglyceride (MCT) so as to reach an amount of 53 mass ppm, the components were mixed by being slowly stirred, and an oil and fat composition was formulated without carrying out any other process, such as heating. An article in which no β-carotene was added to the rapeseed oil serving as the base oil in example 5 was employed as comparative example 2.
Table 3 shows each of the type of carotenoid, the type of base oil (and the iodine value thereof), the quantified measurement value for the carotenoid content of the composition prior to heat treatment (carotenoid content), the heat treatment conditions, and the quantified measurement value for the carotenoid content of the composition after heat treatment (remaining amount of carotenoid).

As shown in table 3, the amount of the added carotenoid (β-carotene or astaxanthin) decreased due to the heat treatment. Under the present formulation conditions, the carotenoid (β-carotene or astaxanthin) added to each of examples 1 to 6 was completely degraded.

[Test Example 1] (Monosodium Glutamate, Part 1)

1 g of monosodium glutamate was dissolved in 499 g of water to formulate an umami aqueous solution A containing 0.2 mass % of monosodium glutamate.
Sensory evaluation of the umami of the oil and fat compositions in comparative example 1, examples 1 to 6, and comparative example 2 was conducted using the umami aqueous solution A. Specifically, once the compositions were diluted with rapeseed oil, as appropriate, so as to reach the blending ratios in the upper section of table 4, the diluted compositions were added to the umami aqueous solution A, 2 mL of the resultant samples was retrieved, and the strength of the umami upon drinking of the samples was scored through evaluation relative to comparative example 1 according to the following criteria, to derive a median value and a mean value for the samples. The sensory evaluation was conducted by three panel experts. A "6" under the following criteria corresponds to the umami of a 0.4 mass % aqueous solution of monosodium glutamate.
(Criteria)
  6 Extremely strong
  5 Considerably strong
  4 Strong
  3 Comparatively strong
  2 Somewhat strong
  1 Barely strong
  0 Equivalent
  −1 Barely weak
  −2 Somewhat weak
  −3 Comparatively weak
  −4 Weak
  −5 Considerably weak
  −6 Extremely weak
The results of the sensory evaluation are collectively shown in the lower section of table 4.

TABLE 3

| | | | | Heating conditions | | |
|---|---|---|---|---|---|---|
| | Carotenoid added | Base oil | Carotenoid content (mass ppm) | Temperature and time | Air blowing amount | Remaining amount of carotenoid (mass ppm) |
| Comparative example 1 | β-carotene | MCT (IV: 0) | 53 | — | — | 53 |
| Example 1 | Astaxanthin | MCT (IV: 0) | 44 | 120° C. (5 hr) → 80° C. (5 hr) | 0.2 L/min | 0 |
| Example 2 | β-carotene | MCT (IV: 0) | 30 | 80° C. (17 hr) | None | 0 |
| Example 3 | β-carotene | MCT (IV: 0) | 60 | 140° C. (3 hr) | 0.2 L/min | 0 |
| Example 4 | β-carotene | MCT (IV: 0) | 28213 | 120° C. (7 hr) | 0.2 L/min | 0 |
| Example 5 | β-carotene | Rapeseed oil (IV: 115) | 53 | 120° C. (5 hr) → 80° C. (5 hr) | 0.2 L/min | 0 |
| Example 6 | β-carotene | MCT (IV: 0) | 53 | 120° C. (5 hr) → 80° C. (5 hr) | 0.2 L/min | 0 |
| Comparative example 2 | — | Rapeseed oil (IV: 115) | 0 | 120° C. (5 hr) → 80° C. (2 hr) | 0.2 L/min | 0 |

TABLE 4

(Monosodium glutamate, part 1)

|  |  | Formulation example 1-1 | Formulation example 1-2 | Formulation example 1-3 | Formulation example 1-4 | Formulation example 1-5 | Formulation example 1-6 | Formulation example 1-7 | Formulation example 1-8 |
|---|---|---|---|---|---|---|---|---|---|
| Oil and fat (g) | Rapeseed oil | 0.2475 | 0.2475 | 0.2475 | 0.2475 | 0.2475 | 0.2475 | 0.2475 | 0.2475 |
|  | Comparative example 1 | 0.0025 |  |  |  |  |  |  |  |
|  | Example 1 |  | 0.0025 |  |  |  |  |  |  |
|  | Example 2 |  |  | 0.0025 |  |  |  |  |  |
|  | Example 3 |  |  |  | 0.0025 |  |  |  |  |
|  | Example 4 |  |  |  |  | 0.0025 |  |  |  |
|  | Example 5 |  |  |  |  |  | 0.0025 |  |  |
|  | Example 6 |  |  |  |  |  |  | 0.0025 |  |
|  | Comparative example 2 |  |  |  |  |  |  |  | 0.0025 |
| Umami aqueous solution A (g) |  | 49.75 | 49.75 | 49.75 | 49.75 | 49.75 | 49.75 | 49.75 | 49.75 |
| Oil fraction (mass %) |  | 0.5 | 0.5 | 0.5 | 0.5 | 0.5 | 0.5 | 0.5 | 0.5 |
| Heat-treated oil and fat concentration (mass ppm) |  | — | 50 | 50 | 50 | 50 | 50 | 50 | 50 |
| Total mass (g) |  | 50 | 50 | 50 | 50 | 50 | 50 | 50 | 50 |
| Heat-treated carotenoid* content (mass ppm) |  | — | 0.0022 | 0.0015 | 0.0030 | 1.4107 | 0.0027 | 0.0027 | 0 |
| Strength of umami | Expert 1 | 0 | 3 | 4 | 3 | 4 | 4 | 4 | 1 |
|  | Expert 2 | 0 | 2 | 5 | 3 | 3 | 4 | 4 | 1 |
|  | Expert 3 | 0 | 3 | 3 | 5 | 3 | 5 | 5 | 0 |
| Median value |  | 0 | 3 | 4 | 3 | 3 | 4 | 4 | 1 |
| Mean value |  | 0 | 3 | 4 | 4 | 3 | 4 | 4 | 1 |

Heat-treated carotenoid*: Amount in terms of carotenoid content prior to heat treatment According to these results, an effect for enhancing the umami of the umami aqueous solution was obtained such that the umami was stronger in formulation examples 1-2 to 1-7, which involved the use of an oil and fat composition (examples 1 to 6) formulated by adding the carotenoid (β-carotene or astaxanthin) to the base oil and then implementing a heat treatment to a certain degree, than in formulation example 1-1, which involved the use of an oil and fat composition (comparative example 1) formulated by adding the β-carotene to the base oil without carrying out heating or other treatment. However, in formulation example 1-8, which involved the use of an oil and fat composition (comparative example 2) formulated by implementing a heat treatment on only the rapeseed oil serving as the base oil, substantially no effect for enhancing the umami of the umami aqueous solution was obtained.

As described above, it has been clarified that a carotenoid added to a base oil is degraded by heat treatment, and that the degradation product of the carotenoid exhibits an effect for enhancing the umami of an umami aqueous solution.

[Test Example 2] (Monosodium Glutamate, Part 2)

An effect for enhancing umami was evaluated using the same method as in test example 1, except that the oil and fat compositions of comparative example 1, examples 3 and 6, and comparative example 2 were added to an umami aqueous solution using the blends indicated in the upper section of table 5.

The results of the sensory evaluation are collectively shown in the lower section of table 5.

TABLE 5

(Monosodium glutamate, part 2)

|  |  | Formulation example 2-1 | Formulation example 2-2 | Formulation example 2-3 | Formulation example 2-4 |
|---|---|---|---|---|---|
| Oil and fat (g) | Rapeseed oil | 0.24975 | 0.24975 | 0.24975 | 0.24975 |
|  | Comparative example 1 | 0.00025 |  |  |  |
|  | Example 3 |  | 0.00025 |  |  |
|  | Example 6 |  |  | 0.00025 |  |
|  | Comparative example 2 |  |  |  | 0.00025 |
| Umami aqueous solution A (g) |  | 49.75 | 49.75 | 49.75 | 49.75 |

TABLE 5-continued

| | | Formulation example 2-1 | Formulation example 2-2 | Formulation example 2-3 | Formulation example 2-4 |
|---|---|---|---|---|---|
| (Monosodium glutamate, part 2) | | | | | |
| Oil fraction (mass %) | | 0.5 | 0.5 | 0.5 | 0.5 |
| Heat-treated oil and fat concentration (mass ppm) | | — | 5 | 5 | 5 |
| Total mass (g) | | 50 | 50 | 50 | 50 |
| Heat-treated carotenoid* content (mass ppm) | | — | 0.00030 | 0.00027 | 0 |
| Strength of umami | Expert 1 | 0 | 2 | 2 | 1 |
| | Expert 2 | 0 | 3 | 2 | 1 |
| | Expert 3 | 0 | 2 | 3 | 1 |
| Median value | | 0 | 2 | 2 | 1 |
| Mean value | | 0 | 2 | 2 | 1 |

Heat-treated carotenoid*: Amount in terms of carotenoid content prior to heat treatment These results have clarified that the effect for enhancing the umami of the umami aqueous solution is obtained when the heat-treated carotenoid content (amount in terms of the amount prior to heat treatment) is within the range of 0.00027 mass ppm or more.

[Test Example 3] (Umami Seasoning)

1 g of a commercially available umami seasoning ("Ajinomoto"®, Ajinomoto Co., Inc.) was dissolved in 499 g of water to formulate an umami aqueous solution B containing 0.2 mass % of the umami seasoning.

An effect for enhancing umami was evaluated using the same method as in test example 1, except that the umami aqueous solution B was used, and the oil and fat compositions of comparative example 1, examples 1 to 6, and comparative example 2 were added to the umami aqueous solution using the blends indicated in the upper section of table 6.

The results of the sensory evaluation are collectively shown in the lower section of table 6.

TABLE 6

| | | Formulation example 3-1 | Formulation example 3-2 | Formulation example 3-3 | Formulation example 3-4 | Formulation example 3-5 | Formulation example 3-6 | Formulation example 3-7 | Formulation example 3-8 |
|---|---|---|---|---|---|---|---|---|---|
| (Umami seasoning) | | | | | | | | | |
| Oil and fat (g) | Rapeseed oil | 0.2475 | 0.2475 | 0.2475 | 0.2475 | 0.2475 | 0.2475 | 0.2475 | 0.2475 |
| | Comparative example 1 | 0.0025 | | | | | | | |
| | Example 1 | | 0.0025 | | | | | | |
| | Example 2 | | | 0.0025 | | | | | |
| | Example 3 | | | | 0.0025 | | | | |
| | Example 4 | | | | | 0.0025 | | | |
| | Example 5 | | | | | | 0.0025 | | |
| | Example 6 | | | | | | | 0.0025 | |
| | Comparative example 2 | | | | | | | | 0.0025 |
| Umami aqueous solution B (g) | | 49.75 | 49.75 | 49.75 | 49.75 | 49.75 | 49.75 | 49.75 | 49.75 |
| Oil fraction (mass %) | | 0.5 | 0.5 | 0.5 | 0.5 | 0.5 | 0.5 | 0.5 | 0.5 |
| Heat-treated oil and fat concentration (mass ppm) | | — | 50 | 50 | 50 | 50 | 50 | 50 | 50 |
| Total mass (g) | | 50 | 50 | 50 | 50 | 50 | 50 | 50 | 50 |
| Heat-treated carotenoid* content (mass ppm) | | — | 0.0022 | 0.0015 | 0.0030 | 1.4107 | 0.0027 | 0.0027 | 0 |
| Strength of umami | Expert 1 | 0 | 3 | 4 | 5 | 4 | 5 | 4 | 0 |
| | Expert 2 | 0 | 3 | 4 | 3 | 3 | 3 | 4 | 1 |
| | Expert 3 | 0 | 2 | 4 | 5 | 4 | 5 | 4 | 2 |
| Median value | | 0 | 3 | 4 | 5 | 4 | 5 | 4 | 1 |
| Mean value | | 0 | 3 | 4 | 4 | 4 | 4 | 4 | 1 |

Heat-treated carotenoid*: Amount in terms of carotenoid content prior to heat treatment These results have clarified that the effect for enhancing the umami of the umami aqueous solution is obtained by the heat-treated carotenoid even in a 0.2 mass % umami aqueous solution formulated using a commercially available umami seasoning.

[Test Example 4] (Nucleic-Acid-Based Umami Component)

1 g of sodium 5'-ribonucleotide (mixture of disodium 5'-inosinate and disodium 5'-guanylate), which is a nucleic-acid-based umami component, was dissolved in 499 g of water to formulate an umami aqueous solution C containing 0.2 mass % of the nucleic-acid-based umami component.

An effect for enhancing umami was evaluated using the same method as in test example 1, except that the umami aqueous solution C was used, and the oil and fat compositions of comparative example 1, examples 3 and 6, and comparative example 2 were added to the umami aqueous solution using the blends indicated in the upper section of table 7.

The results of the sensory evaluation are collectively shown in the lower section of table 7.

TABLE 7

(Nucleic-acid-based umami component)

| | | Formulation example 4-1 | Formulation example 4-2 | Formulation example 4-3 | Formulation example 4-4 |
|---|---|---|---|---|---|
| Oil and fat (g) | Rapeseed oil | 0.2475 | 0.2475 | 0.2475 | 0.2475 |
| | Comparative example 1 | 0.0025 | | | |
| | Example 3 | | 0.0025 | | |
| | Example 6 | | | 0.0025 | |
| | Comparative example 2 | | | | 0.0025 |
| Umami aqueous solution C (g) | | 49.75 | 49.75 | 49.75 | 49.75 |
| Oil fraction (mass %) | | 0.5 | 0.5 | 0.5 | 0.5 |
| Heat-treated oil and fat concentration (mass ppm) | | — | 50 | 50 | 50 |
| Total mass (g) | | 50 | 50 | 50 | 50 |
| Heat-treated carotenoid* content (mass ppm) | | — | 0.0030 | 0.0027 | 0 |
| Strength of umami | Expert 1 | 0 | 2 | 2 | 0 |
| | Expert 2 | 0 | 3 | 3 | 0 |
| | Expert 3 | 0 | 2 | 3 | 1 |
| Median value | | 0 | 2 | 3 | 0 |
| Mean value | | 0 | 2 | 3 | 0 |

Heat-treated carotenoid*: Amount in terms of carotenoid content prior to heat treatment These results have clarified that the effect for enhancing the umami of the umami aqueous solution is obtained by the heat-treated carotenoid even in a 0.2 mass % umami aqueous solution formulated using a nucleic-acid-based umami component.

[Test Example 5] (Chicken Stock)

4.17 g of a commercially available powdered chicken stock (trade name "Maru chicken stock," Ajinomoto Co., Ltd.) was dissolved in 495.83 g of water to formulate an umami aqueous solution D containing 0.83 mass % of the powdered chicken stock.

An effect for enhancing umami was evaluated using the same method as in test example 1, except that the umami aqueous solution D was used, and the oil and fat compositions of comparative example 1, examples 3 and 6, and comparative example 2 were added to the umami aqueous solution using the blends indicated in the upper section of table 8.

The results of the sensory evaluation are collectively shown in the lower section of table 8.

TABLE 8

(Chicken stock)

|  |  | Formulation example 5-1 | Formulation example 5-2 | Formulation example 5-3 | Formulation example 5-4 |
|---|---|---|---|---|---|
| Oil and fat (g) | Rapeseed oil | 0.2475 | 0.2475 | 0.2475 | 0.2475 |
|  | Comparative example 1 | 0.0025 |  |  |  |
|  | Example 3 |  | 0.0025 |  |  |
|  | Example 6 |  |  | 0.0025 |  |
|  | Comparative example 2 |  |  |  | 0.0025 |
| Umami aqueous solution D (g) |  | 49.75 | 49.75 | 49.75 | 49.75 |
| Oil fraction (mass %) |  | 0.5 | 0.5 | 0.5 | 0.5 |
| Heat-treated oil and fat concentration (mass ppm) |  | — | 50 | 50 | 50 |
| Total mass (g) |  | 50 | 50 | 50 | 50 |
| Heat-treated carotenoid* content (mass ppm) |  | — | 0.0030 | 0.0027 | 0 |
| Strength of umami | Expert 1 | 0 | 2 | 2 | 1 |
|  | Expert 2 | 0 | 4 | 3 | 0 |
|  | Expert 3 | 0 | 2 | 2 | 0 |
| Median value |  | 0 | 2 | 2 | 0 |
| Mean value |  | 0 | 3 | 2 | 0 |

Heat-treated carotenoid*: Amount in terms of carotenoid content prior to heat treatment These results have clarified that the effect for enhancing the umami of the umami aqueous solution is obtained by the heat-treated carotenoid even in a 0.83 mass % umami aqueous solution formulated using a commercially available powdered chicken stock.

[Test Example 6] (Powdered Bonito Stock)

3.33 g of a commercially available powdered bonito stock ("Hondashi"®, Ajinomoto Co., Ltd.) was dissolved in 496.67 g of water to formulate an umami aqueous solution E containing 0.67 mass % of the powdered bonito stock.

An effect for enhancing umami was evaluated using the same method as in test example 1, except that the umami aqueous solution E was used, and the oil and fat compositions of comparative example 1, examples 3 and 6, and comparative example 2 were added to the umami aqueous solution using the blends indicated in the upper section of table 9.

The results of the sensory evaluation are collectively shown in the lower section of table 9.

TABLE 9

(Powdered bonito stock)

|  |  | Formulation example 6-1 | Formulation example 6-2 | Formulation example 6-3 | Formulation example 6-4 |
|---|---|---|---|---|---|
| Oil and fat (g) | Rapeseed oil | 0.2475 | 0.2475 | 0.2475 | 0.2475 |
|  | Comparative example 1 | 0.0025 |  |  |  |
|  | Example 3 |  | 0.0025 |  |  |
|  | Example 6 |  |  | 0.0025 |  |
|  | Comparative example 2 |  |  |  | 0.0025 |
| Umami aqueous solution E (g) |  | 49.75 | 49.75 | 49.75 | 49.75 |
| Oil fraction (mass %) |  | 0.5 | 0.5 | 0.5 | 0.5 |
| Heat-treated oil and fat concentration (mass ppm) |  | — | 50 | 50 | 50 |
| Total mass (g) |  | 50 | 50 | 50 | 50 |
| Heat-treated carotenoid* content (mass ppm) |  | — | 0.0030 | 0.0027 | 0 |
| Strength of umami | Expert 1 | 0 | 1 | 2 | 0 |
|  | Expert 2 | 0 | 3 | 3 | 1 |
|  | Expert 3 | 0 | 2 | 2 | 0 |

TABLE 9-continued (Powdered bonito stock)

|  | Formulation example 6-1 | Formulation example 6-2 | Formulation example 6-3 | Formulation example 6-4 |
|---|---|---|---|---|
| Median value | 0 | 2 | 2 | 0 |
| Mean value | 0 | 2 | 2 | 0 |

Heat-treated carotenoid*: Amount in terms of carotenoid content prior to heat treatment These results have clarified that the effect for enhancing the umami of the umami aqueous solution is obtained by the heat-treated carotenoid even in a 0.67 mass % umami aqueous solution formulated using a commercially available powdered bonito stock.

[Test Example 7] (Powdered Konbu Stock)

3.33 g of a commercially available powdered konbu stock ("Hondashi"® konbu stock, Ajinomoto Co., Ltd.) was dissolved in 496.67 g of water to formulate an umami aqueous solution F containing 0.67 mass % of the powdered konbu stock.

An effect for enhancing umami was evaluated using the same method as in test example 1, except that the umami aqueous solution F was used, and the oil and fat compositions of comparative example 1, examples 3 and 6, and comparative example 2 were added to the umami aqueous solution using the blends indicated in the upper section of table 10.

The results of the sensory evaluation are collectively shown in the lower section of table 10.

These results have clarified that the effect for enhancing the umami of the umami aqueous solution is obtained by the heat-treated carotenoid even in a 0.67 mass % umami aqueous solution formulated using a commercially available powdered konbu stock.

[Test Example 8] (Consommé)

4.17 g of solid consommé (trade name "Ajinomoto KK consommé," Ajinomoto Co., Ltd.) was dissolved in 495.83 g of water to formulate an umami aqueous solution G containing 0.83 mass % of the solid consommé.

An effect for enhancing umami was evaluated using the same method as in test example 1, except that the umami aqueous solution G was used, and the oil and fat compositions of comparative example 1, examples 3 and 6, and comparative example 2 were added to the umami aqueous solution using the blends indicated in the upper section of table 11.

The results of the sensory evaluation are collectively shown in the lower section of table 11.

TABLE 10

(Powdered konbu stock)

|  |  | Formulation example 7-1 | Formulation example 7-2 | Formulation example 7-3 | Formulation example 7-4 |
|---|---|---|---|---|---|
| Oil and fat (g) | Rapeseed oil | 0.2475 | 0.2475 | 0.2475 | 0.2475 |
|  | Comparative example 1 | 0.0025 |  |  |  |
|  | Example 3 |  | 0.0025 |  |  |
|  | Example 6 |  |  | 0.0025 |  |
|  | Comparative example 2 |  |  |  | 0.0025 |
| Umami aqueous solution F (g) |  | 49.75 | 49.75 | 49.75 | 49.75 |
| Oil fraction (mass %) |  | 0.5 | 0.5 | 0.5 | 0.5 |
| Heat-treated oil and fat concentration (mass ppm) |  | — | 50 | 50 | 50 |
| Total mass (g) |  | 50 | 50 | 50 | 50 |
| Heat-treated carotenoid* content (mass ppm) |  | — | 0.0030 | 0.0027 | 0 |
| Strength of umami | Expert 1 | 0 | 3 | 3 | 0 |
|  | Expert 2 | 0 | 1 | 2 | 0 |
|  | Expert 3 | 0 | 2 | 2 | −1 |
| Median value |  | 0 | 2 | 2 | 0 |
| Mean value |  | 0 | 2 | 2 | 0 |

Heat-treated carotenoid*: Amount in terms of carotenoid content prior to heat treatment

TABLE 11

(Consommé)

|  |  | Formulation example 8-1 | Formulation example 8-2 | Formulation example 8-3 | Formulation example 8-4 |
|---|---|---|---|---|---|
| Oil and fat (g) | Rapeseed oil | 0.2475 | 0.2475 | 0.2475 | 0.2475 |
|  | Comparative example 1 | 0.0025 |  |  |  |
|  | Example 3 |  | 0.0025 |  |  |
|  | Example 6 |  |  | 0.0025 |  |
|  | Comparative example 2 |  |  |  | 0.0025 |
| Umami aqueous solution G (g) |  | 49.75 | 49.75 | 49.75 | 49.75 |
| Oil fraction (mass %) |  | 0.5 | 0.5 | 0.5 | 0.5 |
| Heat-treated oil and fat concentration (mass ppm) |  | — | 50 | 50 | 50 |
| Total mass (g) |  | 50 | 50 | 50 | 50 |
| Heat-treated carotenoid* content (mass ppm) |  | — | 0.0030 | 0.0027 | 0 |
| Strength of umami | Expert 1 | 0 | 3 | 3 | 2 |
|  | Expert 2 | 0 | 3 | 3 | 0 |
|  | Expert 3 | 0 | 2 | 1 | 0 |
| Median value |  | 0 | 3 | 3 | 0 |
| Mean value |  | 0 | 3 | 2 | 1 |

Heat-treated carotenoid*: Amount in terms of carotenoid content prior to heat treatment These results have clarified that the effect for enhancing the umami of the umami aqueous solution is obtained by the heat-treated carotenoid even in a 0.83 mass % umami aqueous solution formulated using solid consommé.

[Test Example 9] (Pork Extract)

6 g of pork extract (product name: Pork stock 50-10-N, DSP Gokyo Food & Chemical Co., Ltd.) was dissolved in 494 g of water to formulate an umami aqueous solution H containing 1.2 mass % of the pork extract.

An effect for enhancing umami was evaluated using the same method as in test example 1, except that the umami aqueous solution H was used, and the oil and fat compositions of comparative example 1, examples 3 and 6, and comparative example 2 were added to the umami aqueous solution using the blends indicated in the upper section of table 12.

The results of the sensory evaluation are collectively shown in the lower section of table 12.

TABLE 12

(Pork extract)

|  |  | Formulation example 9-1 | Formulation example 9-2 | Formulation example 9-3 | Formulation example 9-4 |
|---|---|---|---|---|---|
| Oil and fat (g) | Rapeseed oil | 0.2475 | 0.2475 | 0.2475 | 0.2475 |
|  | Comparative example 1 | 0.0025 |  |  |  |
|  | Example 3 |  | 0.0025 |  |  |
|  | Example 6 |  |  | 0.0025 |  |
|  | Comparative example 2 |  |  |  | 0.0025 |
| Umami aqueous solution H (g) |  | 49.75 | 49.75 | 49.75 | 49.75 |
| Oil fraction (mass %) |  | 0.5 | 0.5 | 0.5 | 0.5 |
| Heat-treated oil and fat concentration (mass ppm) |  | — | 50 | 50 | 50 |
| Total mass (g) |  | 50 | 50 | 50 | 50 |
| Heat-treated carotenoid* content (mass ppm) |  | — | 0.0030 | 0.0027 | 0 |
| Strength of umami | Expert 1 | 0 | 2 | 2 | 1 |
|  | Expert 2 | 0 | 1 | 1 | 0 |
|  | Expert 3 | 0 | 2 | 2 | 0 |
| Median value |  | 0 | 2 | 2 | 0 |
| Mean value |  | 0 | 2 | 2 | 0 |

Heat-treated carotenoid*: Amount in terms of carotenoid content prior to heat treatment These results have clarified that the effect for enhancing the umami of the umami aqueous solution is obtained by the heat-treated carotenoid even in a 1.2 mass % umami aqueous solution formulated using a pork extract.

[Test Example 10] (Beef Extract)

6 g of beef extract (product name: Adipol beef UP, DSP Gokyo Food & Chemical Co., Ltd.) was dissolved in 494 g of water to formulate an umami aqueous solution I containing 1.2 mass % of the beef extract.

An effect for enhancing umami was evaluated using the same method as in test example 1, except that the umami aqueous solution I was used, and the oil and fat compositions of comparative example 1, examples 3 and 6, and comparative example 2 were added to the umami aqueous solution using the blends indicated in the upper section of table 13.

The results of the sensory evaluation are collectively shown in the lower section of table 13.

heat-treated carotenoid even in a 1.2 mass % umami aqueous solution formulated using a beef extract.

[Test Example 11] (Yeast Extract)

6 g of yeast extract (product name: Aromild, DSP Gokyo Food & Chemical Co., Ltd.) was dissolved in 494 g of water to formulate an umami aqueous solution J containing 1.2 mass % of the yeast extract.

An effect for enhancing umami was evaluated using the same method as in test example 1, except that the umami aqueous solution J was used, and the oil and fat compositions of comparative example 1, examples 3 and 6, and comparative example 2 were added to the umami aqueous solution using the blends indicated in the upper section of table 14.

The results of the sensory evaluation are collectively shown in the lower section of table 14.

TABLE 13

(Beef extract)

| | | Formulation example 10-1 | Formulation example 10-2 | Formulation example 10-3 | Formulation example 10-4 |
|---|---|---|---|---|---|
| Oil and fat (g) | Rapeseed oil | 0.2475 | 0.2475 | 0.2475 | 0.2475 |
| | Comparative example 1 | 0.0025 | | | |
| | Example 3 | | 0.0025 | | |
| | Example 6 | | | 0.0025 | |
| | Comparative example 2 | | | | 0.0025 |
| Umami aqueous solution I (g) | | 49.75 | 49.75 | 49.75 | 49.75 |
| Oil fraction (mass %) | | 0.5 | 0.5 | 0.5 | 0.5 |
| Heat-treated oil and fat concentration (mass ppm) | | — | 50 | 50 | 50 |
| Total mass (g) | | 50 | 50 | 50 | 50 |
| Heat-treated carotenoid* content (mass ppm) | | — | 0.0030 | 0.0027 | 0 |
| Strength of umami | Expert 1 | 0 | 4 | 5 | 2 |
| | Expert 2 | 0 | 3 | 3 | 1 |
| | Expert 3 | 0 | 3 | 3 | 1 |
| Median value | | 0 | 3 | 3 | 1 |
| Mean value | | 0 | 3 | 4 | 1 |

Heat-treated carotenoid*: Amount in terms of carotenoid content prior to heat treatment These results have clarified that the effect for enhancing the umami of the umami aqueous solution is obtained by the

TABLE 14

(Yeast extract)

| | | Formulation example 11-1 | Formulation example 11-2 | Formulation example 11-3 | Formulation example 11-4 |
|---|---|---|---|---|---|
| Oil and fat (g) | Rapeseed oil | 0.2475 | 0.2475 | 0.2475 | 0.2475 |
| | Comparative example 1 | 0.0025 | | | |
| | Example 3 | | 0.0025 | | |
| | Example 6 | | | 0.0025 | |
| | Comparative example 2 | | | | 0.0025 |
| Umami aqueous solution J (g) | | 49.75 | 49.75 | 49.75 | 49.75 |
| Oil fraction (mass %) | | 0.5 | 0.5 | 0.5 | 0.5 |

TABLE 14-continued (Yeast extract)

|  | | Formulation example 11-1 | Formulation example 11-2 | Formulation example 11-3 | Formulation example 11-4 |
|---|---|---|---|---|---|
| Heat-treated oil and fat concentration (mass ppm) | | — | 50 | 50 | 50 |
| Total mass (g) | | 50 | 50 | 50 | 50 |
| Heat-treated carotenoid* content (mass ppm) | | — | 0.0030 | 0.0027 | 0 |
| Strength of umami | Expert 1 | 0 | 1 | 2 | 0 |
|  | Expert 2 | 0 | 1 | 2 | 0 |
|  | Expert 3 | 0 | 1 | 1 | 0 |
| Median value | | 0 | 1 | 2 | 0 |
| Mean value | | 0 | 1 | 2 | 0 |

Heat-treated carotenoid*: Amount in terms of carotenoid content prior to heat treatment These results have clarified that the effect for enhancing the umami of the umami aqueous solution is obtained by the heat-treated carotenoid even in a 1.2 mass % umami aqueous solution formulated using a yeast extract.

[Test Example 12] (Konbu Stock)

20 g of konbu was placed in 1000 g of water, the mixture was heated over medium heat until just before boiling, and then the konbu was removed to formulate a konbu stock.

An effect for enhancing umami was evaluated using the same method as in test example 1, except that the konbu stock was used as an umami aqueous solution K, and the oil and fat compositions of comparative example 1, examples 3 and 6, and comparative example 2 were added to the umami aqueous solution using the blends indicated in the upper section of table 15.

The results of the sensory evaluation are collectively shown in the lower section of table 15.

TABLE 15

(Konbu stock)

|  | | Formulation example 12-1 | Formulation example 12-2 | Formulation example 12-3 | Formulation example 12-4 |
|---|---|---|---|---|---|
| Oil and fat (g) | Rapeseed oil | 0.2475 | 0.2475 | 0.2475 | 0.2475 |
|  | Comparative example 1 | 0.0025 | | | |
|  | Example 3 | | 0.0025 | | |
|  | Example 6 | | | 0.0025 | |
|  | Comparative example 2 | | | | 0.0025 |
| Umami aqueous solution K (g) | | 49.75 | 49.75 | 49.75 | 49.75 |
| Oil fraction (mass %) | | 0.5 | 0.5 | 0.5 | 0.5 |
| Heat-treated oil and fat concentration (mass ppm) | | — | 50 | 50 | 50 |
| Total mass (g) | | 50 | 50 | 50 | 50 |
| Heat-treated carotenoid* content (mass ppm) | | — | 0.0030 | 0.0027 | 0 |
| Strength of umami | Expert 1 | 0 | 1 | 1 | 0 |
|  | Expert 2 | 0 | 2 | 2 | 1 |
|  | Expert 3 | 0 | 2 | 2 | 0 |
| Median value | | 0 | 2 | 2 | 0 |
| Mean value | | 0 | 2 | 2 | 0 |

Heat-treated carotenoid*: Amount in terms of carotenoid content prior to heat treatment These results have clarified that the effect for enhancing the umami of the umami aqueous solution is obtained by the heat-treated carotenoid even in an umami aqueous solution formed from konbu stock.

The invention claimed is:

1. A method for manufacturing a food product of which an umami is enhanced, the method including a step for incorporating an umami-enhancing composition containing a carotenoid degradation product as an active ingredient in the food product, wherein the food product is a seasoning or extract, and
    the umami-enhancing composition contains $1 \times 10^{-6}$ mass ppm or more and 100000 mass ppm or less of the carotenoid degradation product in terms of the amount of pre-degraded carotenoids.

2. The method for manufacturing a food product of which an umami is enhanced according to claim 1, wherein the carotenoid degradation product is a degradation product of one or more selected from the group consisting of carotenes and xanthophylls.

3. The method for manufacturing a food product of which an umami is enhanced according to claim 1, wherein the umami-enhancing composition is in the form of an edible oil and fat composition.

4. The method for manufacturing a food product of which an umami is enhanced according to claim 1, wherein the carotenoid degradation product is incorporated in the food product in an amount of $1\times10^{-8}$ mass ppm or more and 100 mass ppm or less in terms of the amount of pre-degraded carotenoids.

5. The method for manufacturing a food product of which an umami is enhanced according to claim 4, wherein the carotenoid degradation product is a degradation product of one or more selected from the group consisting of carotenes and xanthophylls.

6. The method for manufacturing a food product of which an umami is enhanced according to claim 4, wherein the umami-enhancing composition is in the form of an edible oil and fat composition.

7. The method for manufacturing a food product of which an umami is enhanced according to claim 5, wherein the umami-enhancing composition is in the form of an edible oil and fat composition.

8. The method for manufacturing a food product of which an umami is enhanced according to claim 1, wherein the seasoning or extract includes monosodium glutamate, sodium inosinate, sodium guanylate, a mixture of two or more of the monosodium glutamate, the sodium inosinate and the sodium guanylate, soy sauce, miso, ketchup, Worcester sauce, chicken stock, powdered bonito stock, powdered konbu stock, consommé, pork extract, beef extract, yeast extract or konbu stock.

* * * * *